(12) United States Patent
Ferguson, III

(10) Patent No.: US 7,155,860 B1
(45) Date of Patent: Jan. 2, 2007

(54) UMBRELLA MOUNTABLE FLOWER POT APPARATUS

(76) Inventor: George W. Ferguson, III, P.O. Box 681, Mi Wuk Village, CA (US) 95346

( * ) Notice: Subject to any disclaimer, the term of this patent is extended or adjusted under 35 U.S.C. 154(b) by 0 days.

(21) Appl. No.: 11/229,123

(22) Filed: Sep. 19, 2005

(51) Int. Cl.
*A01G 9/02* (2006.01)

(52) U.S. Cl. .............. 47/66.6; 47/66.1; 47/83; 47/41.14; 248/219.4; 248/230.3; 248/230.5; 248/230.6

(58) Field of Classification Search .......... 47/66, 47/66.1, 66.3, 67, 66.4, 65, 66.7, 86, 65.5, 47/39, 66.6, 83, 41.14, 41.91; D11/143, D11/144; 248/27.8, 219.4, 230.3, 230.5, 248/230.6
See application file for complete search history.

(56) References Cited

U.S. PATENT DOCUMENTS

| | | | | |
|---|---|---|---|---|
| 1,499,473 A | * | 7/1924 | Price | 47/67 |
| 1,683,271 A | * | 9/1928 | Thompson et al. | 47/71 |
| 3,747,268 A | * | 7/1973 | Linder | 47/67 |
| 4,597,221 A | | 7/1986 | Adair et al. | |
| 4,847,741 A | * | 7/1989 | Boettinger | 362/431 |
| D382,511 S | * | 8/1997 | Azarian | D11/143 |
| D383,417 S | | 9/1997 | Davis | |
| 5,960,587 A | | 10/1999 | Brasseur, Jr. et al. | |
| D416,214 S | * | 11/1999 | Conner | D11/143 |
| 6,161,333 A | | 12/2000 | Poston | |
| 6,381,902 B1 | | 5/2002 | Batshon | |
| 6,615,543 B1 | | 9/2003 | Palsrok | |
| 2002/0134017 A1 | * | 9/2002 | Gibbs | 47/86 |
| 2003/0196376 A1 | * | 10/2003 | Taylor | 47/66.6 |

FOREIGN PATENT DOCUMENTS

| | | | | |
|---|---|---|---|---|
| FR | 2717346 A1 | * | 9/1995 | |
| GB | 2093673 A | * | 9/1982 | |
| JP | 2001204255 A | * | 7/2001 | |
| KR | 2001109511 A | * | 11/2001 | |

* cited by examiner

*Primary Examiner*—Andrea M. Valenti

(57) ABSTRACT

An umbrella mountable flower pot apparatus includes a container that has a bottom wall and a perimeter wall that is attached to and extends upwardly from the bottom wall. The container has a hemispherical shape. A dividing wall is attached to and extends across the container. An aperture extends upwardly through the bottom wall and through the dividing wall. The container has a break therein so that the first portion is separable from the second portion and a pair of dividing walls is defined. A coupling apparatus is attached to the first and second portions and is configured to secure the first and second portions together and to a post extending through the aperture.

6 Claims, 6 Drawing Sheets

UMBRELLA MOUNTABLE FLOWER POT APPARATUS

BACKGROUND OF THE INVENTION

1. Field of the Invention

The present invention relates to flower pot devices and more particularly pertains to a new flower pot device for supporting soil and a plurality of plants on a post, and more in particular, on a post of an umbrella positioned in a table.

2. Description of the Prior Art

The use of flower pot devices is known in the prior art. U.S. Pat. No. 6,161,333 describes a flower pot system that may be mounted on an umbrella post of a patio table. Another type of flower pot device is U.S. Pat. No. 4,597,221 having a structure configured to be mounted on an umbrella post. Still yet another such device is found in U.S. Pat. No. 5,960,587.

While these devices fulfill their respective, particular objectives and requirements, the need remains for a device that may be attached to an umbrella post of a patio table in such a manner that the device is securely fastened to the umbrella. The device should further include a plurality of drain openings to all excess water within the device to drain away from the plants without the water pouring onto the patio table.

SUMMARY OF THE INVENTION

The present invention meets the needs presented above by generally comprising a container that has a bottom wall and a perimeter wall that is attached to and extends upwardly from the bottom wall. The container has a hemispherical shape. The perimeter wall has an upper edge defining an opening extending into the container. A dividing wall is attached to and extends across the container. The dividing wall divides the container into a first portion and a second portion each having a generally equal size and shape. An aperture extends upwardly through the bottom wall and through the dividing wall. A central area of the dividing wall defines a sleeve for receiving a post extending through the aperture. The container has a break therein that extends into an upper edge of the dividing wall and through the container along a plane of the dividing wall so that the first portion is separable from the second portion and a pair of dividing walls is defined. A coupling apparatus is attached to the first and second portions and is configured to secure the first and second portions together and to the post.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
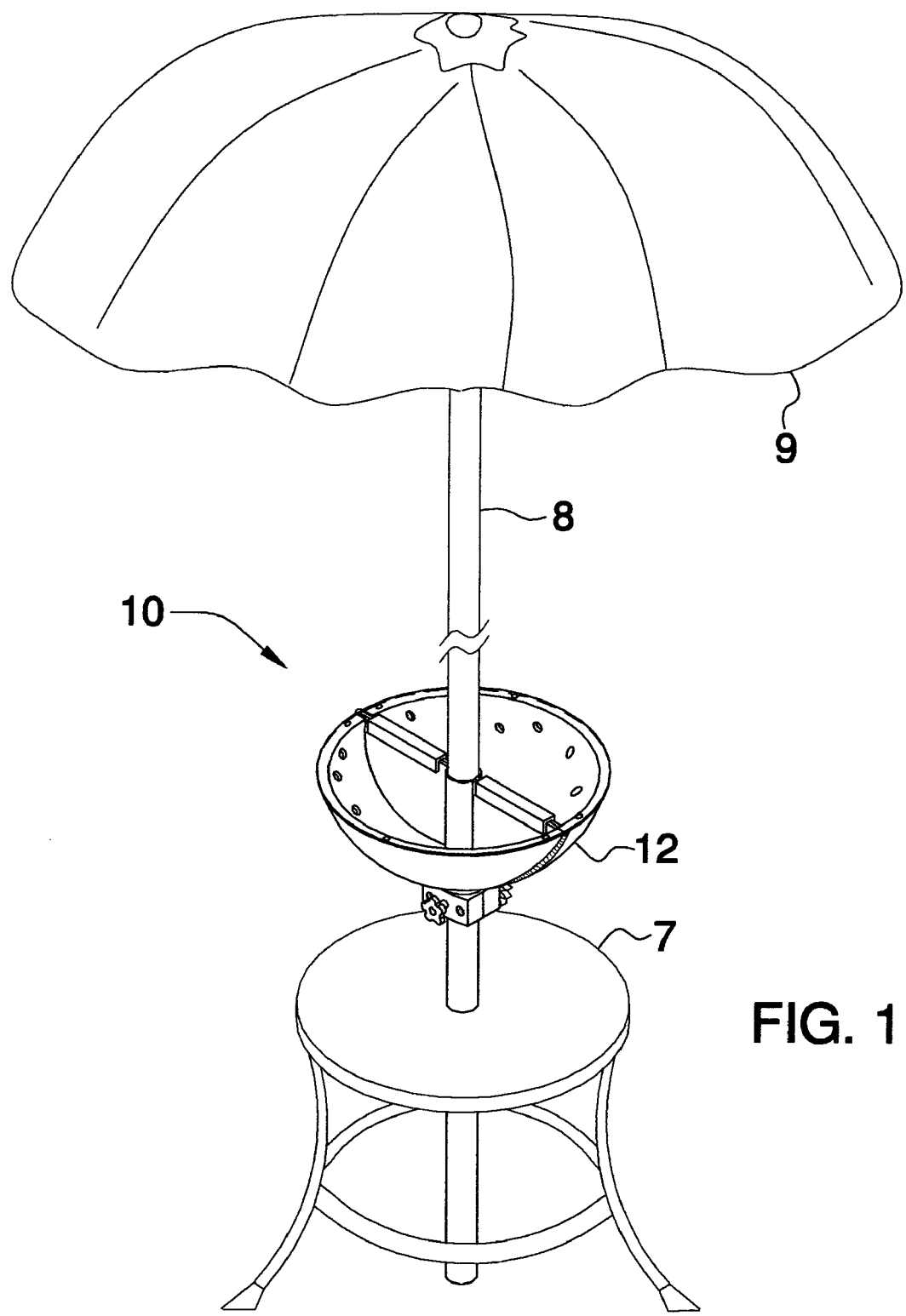
FIG. 1 is a perspective in-use view of a umbrella mountable flower pot apparatus according to the present invention.
Figure 2:
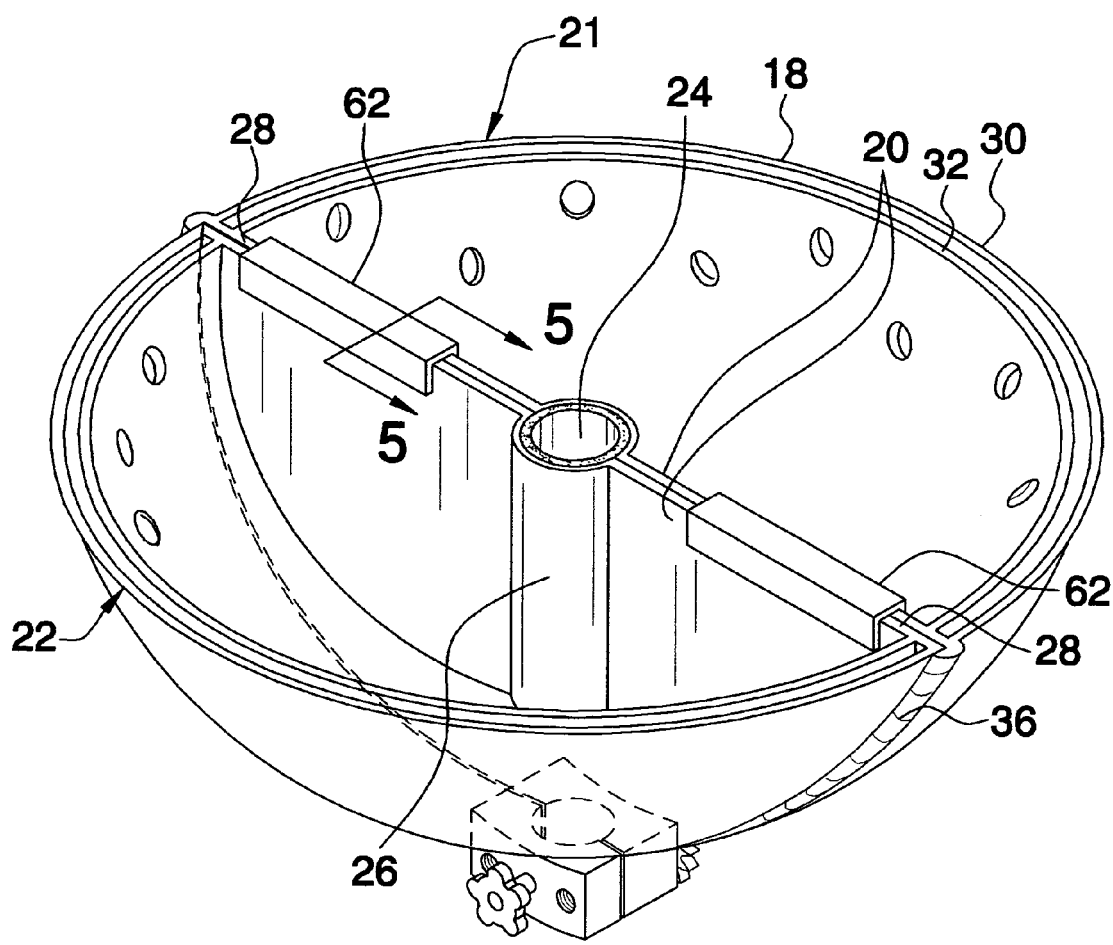
FIG. 2 is a perspective view of the present invention.
Figure 3:
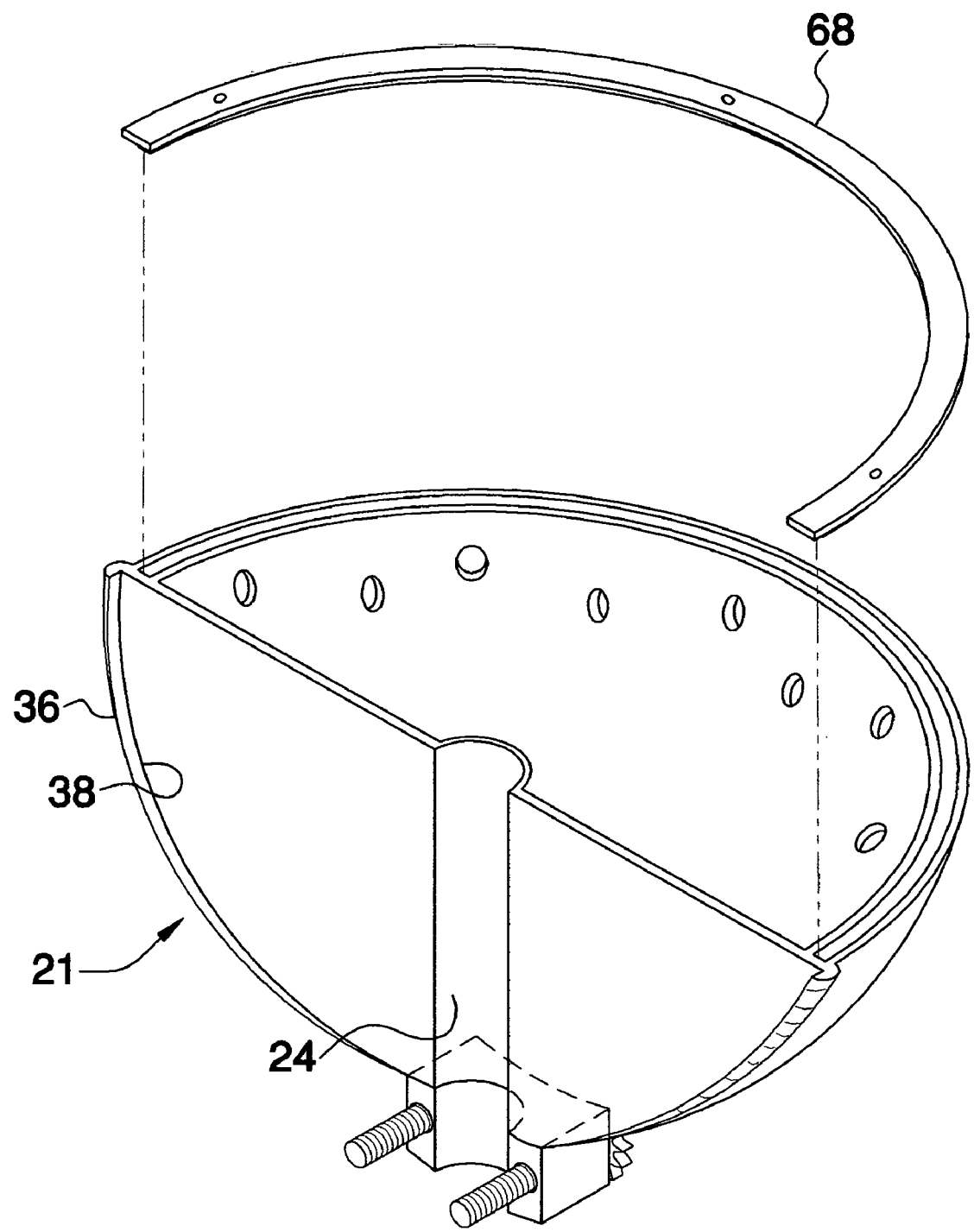
FIG. 3 is a perspective view of a first portion of a container of the present invention.
Figure 4:
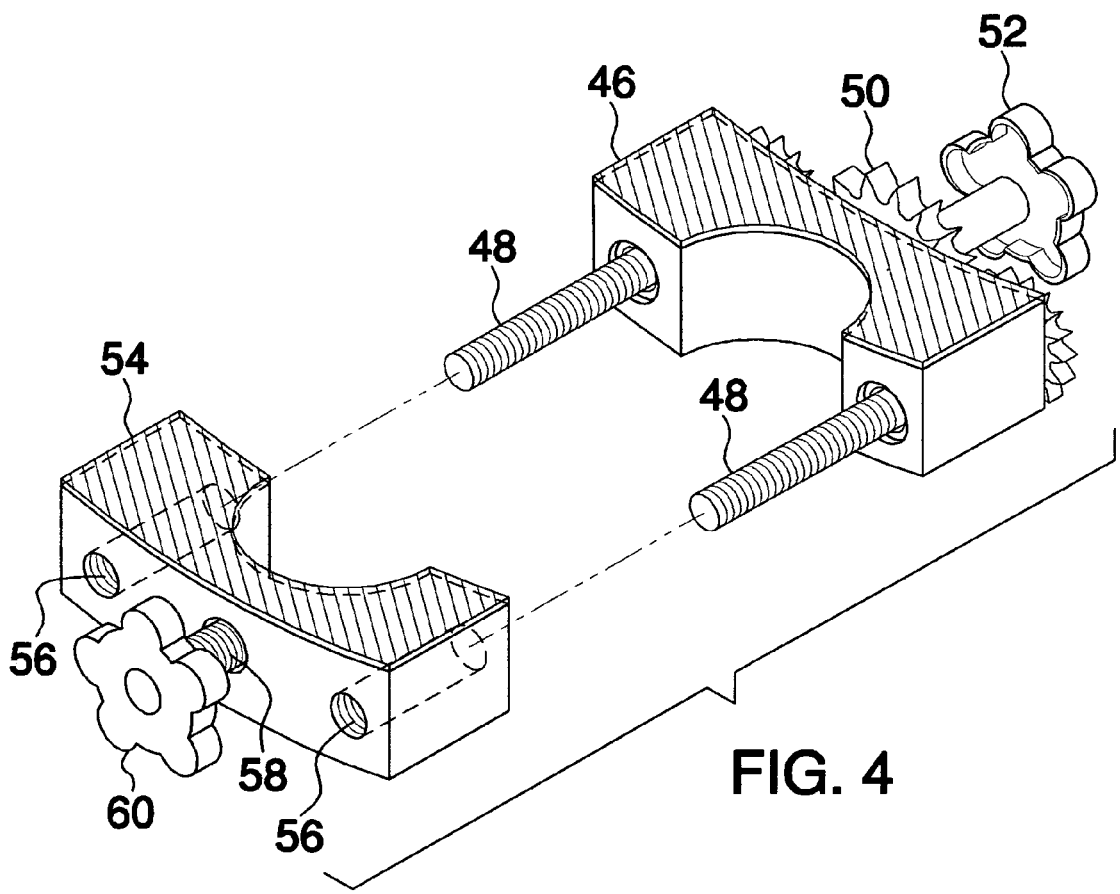
FIG. 4 is a perspective view of a coupling apparatus of the present invention.
Figure 5:
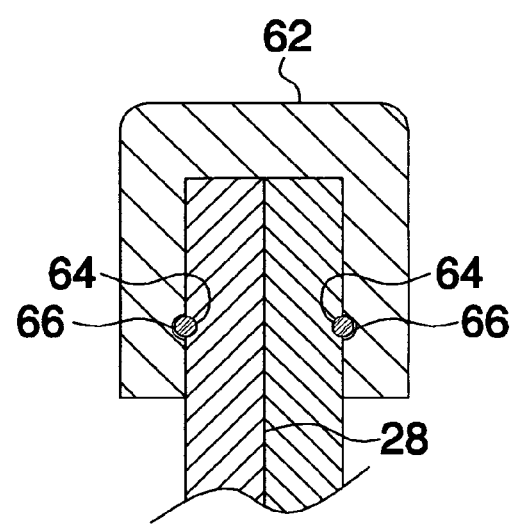
FIG. 5 is a cross-sectional view taken along line 5—5 of FIG. 2 of the present invention.
Figure 6:
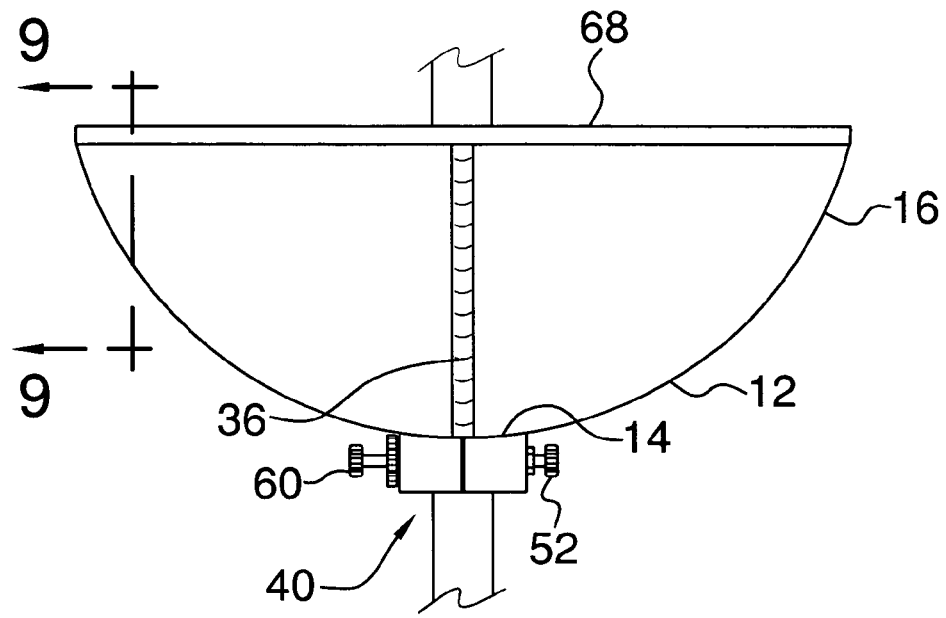
FIG. 6 is a side view of the present invention.
Figure 7:
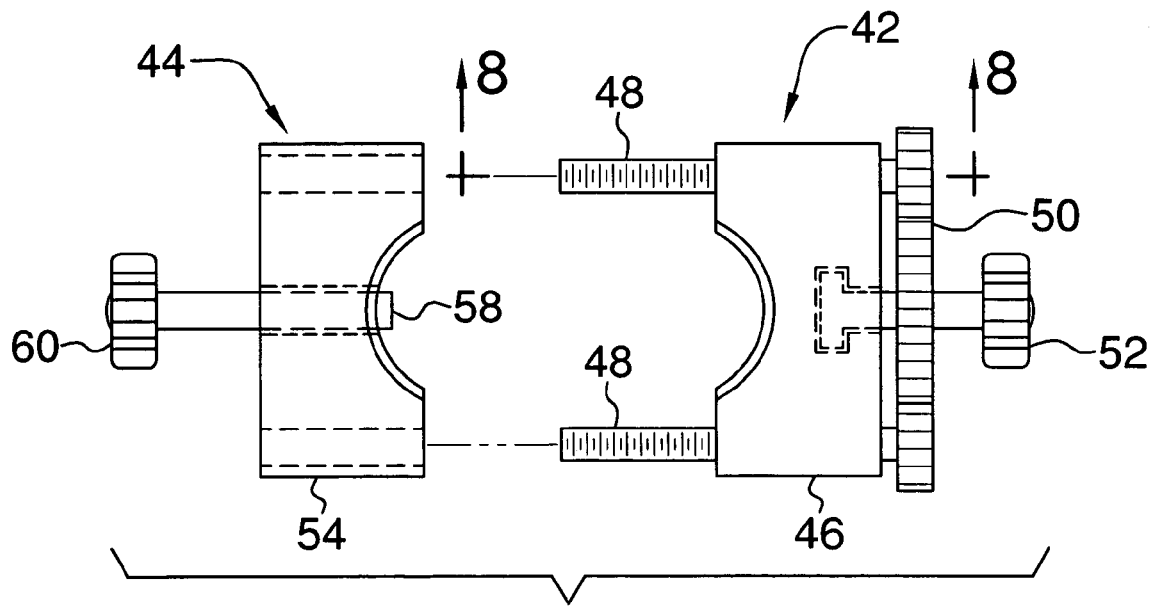
FIG. 7 is a bottom view of the coupling apparatus of the present invention.
Figure 8:
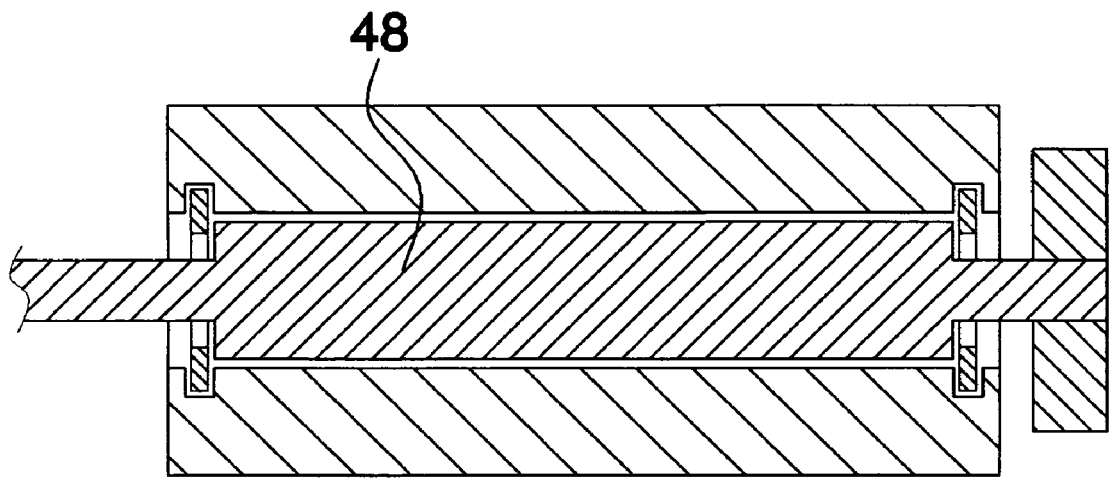
FIG. 8 is a cross-sectional view taken along line 8—8 of FIG. 7 of the present invention.
Figure 9:
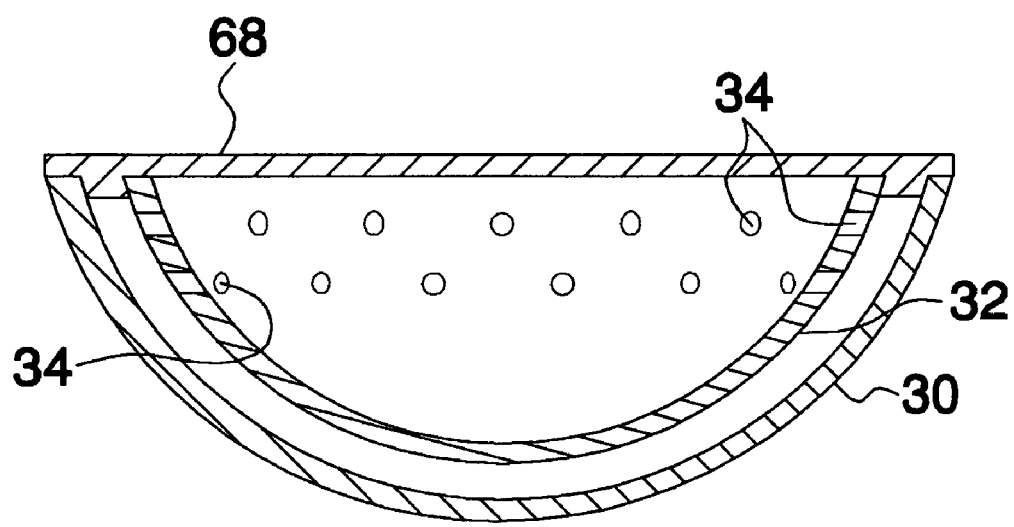
FIG. 9 is a cross-sectional view taken along line 9—9 of FIG. 6 of the present invention.

With reference now to the drawings, and in particular to FIGS. 1 through 9 thereof, a new flower pot device embodying the principles and concepts of the present invention and generally designated by the reference numeral 10 will be described.

As best illustrated in FIGS. 1 through 9, the umbrella mountable flower pot apparatus 10 generally comprises a container 12 that has a bottom wall 14 and a perimeter wall 16 that is attached to and extends upwardly from the bottom wall 14. The container 12 has a hemispherical shape. The perimeter wall 16 has an upper edge 18 defining an opening extending into the container 12. A dividing wall 20 is attached to and extends across the container 12. The dividing wall 20 divides the container into a first portion 21 and a second portion 22 having a generally equal size and shape with respect to each other. An aperture 24 extends upwardly through the bottom wall 14 and through the dividing wall 20. A central area 26 of the dividing wall 20 defines a sleeve for receiving a post 8 extending through the aperture 24.

The container 12 has a break 28 therein. The break 28 extends into an upper edge of the dividing wall 20 and through the container 12 along a plane of the dividing wall 24 so that the first portion 21 is separable from the second portion 22 and a pair of dividing walls 20 is defined. The perimeter wall 16 includes an outer wall 30 and an inner wall 32. The inner wall 32 is spaced from the outer wall 30 and has a plurality of drain holes 34 extending therethrough. The drain holes 34 are positioned nearer the upper edge 18 of the perimeter wall 16 than the bottom wall 14. A perimeter flange 36 is attached to and extends along a lateral edge 38 of the first portion 21. The flange 36 extends over a lateral edge of the second portion 22 when the first 21 and second 22 portions are abutted against each other to hide the seam between the first 22 and second 22 portions.

A coupling apparatus 40 is attached to the first 21 and second 22 portions and is configured to secure the first 21 and second 22 portions together and to the post 8. The coupling apparatus 40 includes a male coupler 42 is attached to the bottom wall 14 of the first portion 21 and a female coupler 44 is attached to the bottom wall 14 of the second portion 22. The aperture 24 extends through the coupling apparatus 40 when the male 42 and female 44 couplers are engaged with each other. The male coupler 42 includes a plate 46 that has a pair of threaded shafts 48 rotatably mounted therein and that extend outwardly of the plate 46.

A gear 50 is mechanically coupled to the shafts 48 and is configured to rotate the shafts 48. A handle 52 is attached to and extends away from the gear 50 and is used for rotating the gear 50. The female coupler 44 includes a panel 54 that has a pair of threaded wells 56 extending therethrough. Each of the shafts 48 is extendable into and threadably couplable to the threaded wells 54 so that the panel 54 is urged toward the plate 46.

A threaded rod 58 is threadably coupled to and extends through the coupling apparatus 40. The rod 58 is extendable into the aperture 24 and abuttable against the post 8. A handle 60 attached to the rod 58 and the handle 52 attached to the gear 50 each preferably resembles a flower.

A plurality of clips 62 is provided. Each of the clips 62 is positionable on and extendable over the upper edge of the dividing walls 20 of the first 21 and second 22 portions and releasably secures the dividing walls 20 together. The clips 62 and dividing walls 20 of the first 21 and second 22 portions preferably include interlocking ridges 64 and troughs 66. Semi-circular coverings 68 may be positioned on the upper edge 18 of the perimeter wall 16 to cover an exposed spaced between the inner 32 and outer 30 walls. Openings 70 are formed in the coverings 68 to allow evaporation of water between the outer 30 and inner 32 walls.

In use, the first 21 and second 22 portions are positioned around a post 8 of an umbrella 9 and secured together with the coupling apparatus 40. The first 21 and second 22 portions may then be used for holding soil for plants. The dividing walls 20 allow the first 21 and second 22 portions to be removed without spillage of the soil while the drain holes 34 prevent overflow of water. These features protect a patio table 7 to which the post 8 is mounted.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A planter assembly configured to be removably mounted on a post, said assembly comprising:

a container having a bottom wall and a perimeter wall being attached to and extending upwardly from said bottom wall, said container having a hemispherical shape, said perimeter wall having an upper edge defining an opening extending into said container, a dividing wall being attached to and extending across said container, said dividing wall dividing said container into a first portion and a second portion each having a generally equal size and shape, an aperture extending upwardly through said bottom wall and through said dividing wall, a central area of said dividing wall defining a sleeve for receiving a post extending through said aperture, said container having a break therein, said break extending into an upper edge of said dividing wall and through said container along a plane of said dividing wall such that the first portion is separable from said second portion and a pair of dividing walls is defined; and a coupling apparatus being attached to said first and second portions and being configured to secure said first and second portions together and to said post, said coupling apparatus including a mate coupler being attached to said bottom wall of said first portion and a female coupler being attached to said bottom wall of said second portion, said aperture extending trough said coupling apparatus when said male and female couplers are engaged with each other, said male coupler including a plate having a pair of threaded shafts rotatably mounted therein and extending outwardly of said plate, a gear being mechanically coupled to said shafts and being configured to rotate said shafts, a handle being attached to and extending away from said gear, said female coupler including a panel having a pair of threaded wells extending therethrough, each of said shafts being extendable into and threadably couplable to said threaded wells such that said panel is urged toward said plate.

2. The assembly according to claim 1, wherein said perimeter wall includes an outer wall and an inner wall, said inner wall being spaced from said outer wall, said inner wall having a plurality of drain holes extending therethrough.

3. The assembly according to claim 2, further including a perimeter flange being attached to and extending along a lateral edge of said first portion, said flange extending over a lateral edge of said second portion when said first and second portions are abutted against each other.

4. The assembly according to claim 1, a threaded rod being threadably coupled to and extending through said coupling apparatus, said rod being extendable into said aperture and abuttable against the post.

5. The assembly according to claim 1, further including a plurality of clips, each of said clips being positionable on and extendable over a top edge of said dividing walls and releasably securing said dividing walls together.

6. A planter assembly configured to be removably mounted on a post, said assembly comprising:

a container having a bottom wall and a perimeter wall being attached to and extending upwardly from said bottom wall, said container having a hemispherical shape, said perimeter wall having an upper edge defining an opening extending into said container, a dividing wall being attached to and extending across said container, said dividing wall dividing said container into a first portion and a second portion each having a generally equal size and shape, an aperture extending upwardly through said bottom wall and through said dividing wall, a central area of said dividing wall defining a sleeve for receiving a post extending through said aperture, said container having a break therein, said break extending into an upper edge of said dividing wall and through said container along a plane of said dividing wall such that the first portion is separable from said second portion and a pair of dividing walls is defined, said perimeter wall including an outer wall and an inner wall, said inner wall being spaced from said outer wall, said inner wall having a plurality of drain holes extending therethrough, a perimeter flange being attached to and extending along a lateral edge of said first portion, said flange extending over a lateral edge of said second portion when said first and second portions are abutted against each other;

a coupling apparatus being attached to said first and second portions and being configured to secure said first and second portions together and to said post, said coupling apparatus including a male coupler being attached to said bottom wall of said first portion and a female coupler being attached to said bottom wall of said second portion, said aperture extending through said coupling apparatus when said male and female couplers are engaged with each other, said male coupler including a plate having a pair of threaded shafts rotatable mounted therein and extending outwardly of said plate, a gear being mechanically coupled to said shafts and being configured to rotate said shafts, a handle being attached to and extending away from said gear, said female coupler including a panel having a pair of threaded wells extending therethrough, each of said shafts being extendable into and threadably couplable to said threaded wells such that said panel is urged toward said plate;

a threaded rod being threadably coupled to and extending through said coupling apparatus, said rod being extendable into said aperture and abuttable against the post; and a plurality of clips, each of said clips being positionable on and extendable over a top edge of said dividing walls and releasably securing said dividing walls together.

* * * * *